(12) United States Patent
Thomas (10) Patent No.: US 10,436,426 B2
(45) Date of Patent: Oct. 8, 2019

(54) FOLDABLE PORTABLE LAMP

(71) Applicant: Jacob M Thomas, Grapevine, TX (US)

(72) Inventor: Jacob M Thomas, Grapevine, TX (US)

( * ) Notice: Subject to any disclaimer, the term of this patent is extended or adjusted under 35 U.S.C. 154(b) by 0 days.

(21) Appl. No.: 15/893,123

(22) Filed: Feb. 9, 2018

(65) Prior Publication Data

US 2019/0093866 A1 Mar. 28, 2019

Related U.S. Application Data

(60) Provisional application No. 62/561,742, filed on Sep. 22, 2017.

(51) Int. Cl.

| | |
|---|---|
| *F21V 21/26* | (2006.01) |
| *F21V 21/14* | (2006.01) |
| *F21V 21/22* | (2006.01) |
| *F21L 14/04* | (2006.01) |
| *F21L 4/08* | (2006.01) |
| *F21W 131/402* | (2006.01) |
| *G05G 5/24* | (2006.01) |
| *F16C 11/10* | (2006.01) |

(52) U.S. Cl.
CPC .............. *F21V 21/26* (2013.01); *F21L 14/04* (2013.01); *F21V 21/145* (2013.01); *F21V 21/22* (2013.01); *F16C 11/10* (2013.01); *F21L 4/08* (2013.01); *F21W 2131/402* (2013.01); *G05G 5/24* (2013.01)

(58) Field of Classification Search
CPC ........ F21V 21/06; F21V 21/14; F21V 21/145; F21V 21/22; F21V 21/26; F21V 21/28; F21V 21/29; F21V 21/30; F21L 14/04; G05G 5/24; E05D 11/1007; F16B 2007/16; F16C 11/10
See application file for complete search history.

(56) References Cited

U.S. PATENT DOCUMENTS

| 2,345,393 | A | * | 3/1944 | Heyermans | ............. F21V 21/22 248/122.1 |
| 3,352,580 | A | * | 11/1967 | Kurz | .................... A47C 20/045 403/93 |
| 4,130,028 | A | * | 12/1978 | Solberg | ................ A47C 20/045 160/302 |

(Continued)

OTHER PUBLICATIONS

PRO PDR Solutions, Solutions, LS-3FH Fathead Light Stand, Jul. 1, 2017, United States.

(Continued)

*Primary Examiner* — Alexander K Garlen
(74) *Attorney, Agent, or Firm* — Timothy G. Ackermann (57) ABSTRACT

A portable lamp comprises a central body, a boom arm, flat tripod stand, and a light unit. The central body is extendable along its vertical axis to a predetermined length. The boom arm is of adjustable length and is rotatably fixed to the upper end of the central body with a positively locking elbow joint, including a ratchet and pawl. The lower end of the central body is fixed with a foldable locking flat tripod stand adapted to hold and provide mobility to the portable lamp. Flat tripod stand includes a spring-biased latch and detents that hold legs in a folded or a down position. The central body, the boom arm, the tripod stand and the light unit are configured to provide up to twelve degrees of freedom jointly.

9 Claims, 10 Drawing Sheets

(56) References Cited

U.S. PATENT DOCUMENTS

| | | | | |
|---|---|---|---|---|
| 4,641,395 A | * | 2/1987 | Banks | A01K 91/08 |
| | | | | 16/348 |
| 5,082,222 A | * | 1/1992 | Hsu | F16M 11/242 |
| | | | | 248/170 |
| 5,102,079 A | * | 4/1992 | Lee | F16M 11/16 |
| | | | | 248/166 |
| 5,265,969 A | * | 11/1993 | Chuang | A45B 17/00 |
| | | | | 16/329 |
| 6,019,484 A | * | 2/2000 | Seyler | F21L 14/04 |
| | | | | 362/287 |
| 6,854,862 B1 | | 2/2005 | Hopf | |
| 7,040,831 B2 | * | 5/2006 | Rapaport | F16C 11/103 |
| | | | | 248/124.1 |
| 8,322,877 B1 | * | 12/2012 | Merritt | F21L 14/04 |
| | | | | 362/220 |
| 2009/0225536 A1 | * | 9/2009 | Emmert | F21L 14/04 |
| | | | | 362/220 |
| 2014/0110541 A1 | * | 4/2014 | Hoe | F16D 1/12 |
| | | | | 248/160 |

OTHER PUBLICATIONS

UltradentTools, Paintless Dent Repair PDR Tool Light Systems, Jul. 1, 2017, United States.
PRO PDR Solutions, Solutions, PDR Light Stands Archives, Jul. 1, 2017, United States.

* cited by examiner

FOLDABLE PORTABLE LAMP

TECHNICAL FIELD

The present invention relates generally to the field of illumination and more particularly to a foldable portable lamp for illuminating a target area, in particular a portion of a vehicle body under repair.

BACKGROUND OF THE INVENTION

Motor vehicle exterior bodies are made of thin metallic sheets due to weight, cost and efficiency constraints. Thus, due to use of thin sheets, the vehicles are susceptible to dents and/or depression due to impacts with other vehicles or obstacles. Further, other sources of dents exist, such as rocks, hail and/or other small objects that may fall upon the sheet metal. Thus, removal of dents and abrasion from the vehicle surfaces is desirable. Removal of dents is assisted by a proper intensity of illumination and angle of illumination as minute dents may only be visible under sufficient intensity and angle of lighting.

The problem that exists with conventional means used for illuminating dented surface is that a person may not be able to adjust or move a conventional light source to be sufficiently near to the dented surface, or with a sufficient flexibility of adjustment of the light source at the appropriate desired angle, or with the ability to consistently maintain the angle. Conventional means may also lack a battery and be required to be connected to power by a cord. The lack of adjustability may also include the light source having a height constraint. Further, the use of metallic sheet is not limited to motor vehicles only but it is also used on other means of transport such as boats, airplanes and railways etc. In addition, a lighting device may be heavy enough, or large enough to cause unnecessary difficulty in transporting the device, for example should the user be repairing the dented surfaces where the car is already located, rather than at a central location.

Accordingly, already existing technologies have number of drawbacks as explained above and there remain a need to have an improved portable lamp which overcomes the aforesaid problems and shortcomings.

SUMMARY OF THE INVENTION

Embodiments of the present invention aim to provide a portable lamp for illuminating an area on which lamp is concentrated. Further, the present invention is used for removal of dents from the surface of the vehicle. The portable lamp provides flexibility and multiple adjustment options to set the portable lamp at required height and desired angle, which can be maintained. Further, the configuration of the portable lamp includes as many as nine degrees of freedom or more that allow a person to set the portable lamp according to the requirement. The portable lamp further includes wheeled rollers adapted to provide mobility to the portable lamp on work floor. Further, the portable lamps include adjustment option such that the portable lamp is easily folded and carried to a different location.

According to a first aspect of the present invention, a portable lamp is disclosed. The portable lamp comprises a central body, a boom arm connected to the central body, a lockable elbow joint, a light unit and a foldable, locking tripod stand. The central body is extendable along a vertical axis of the central body to a predetermined length. The central body has a first end and a second end. The boom arm is of adjustable length and has a proximal end and a distal end. The distal end of the boom arm is fixed to the locking elbow joint at the first end of the central body. The locking elbow joint supports the boom arm at the distal end, and rotates about a horizontal axis, allowing the boom arm's proximal end to elevate. The second end of the central body is fixed with a foldable tripod stand adapted to hold, provide support to, and allow translation of, the portable lamp. The light unit is releasably and rotatably fixed to the proximal end of the boom arm. The light unit is capable of illuminating the surface on which the light unit is concentrated. The central body, the boom arm, the tripod stand and the light unit are configured to provide over nine degrees of freedom jointly.

In accordance with an embodiment of the invention, the lamp has many possible components and capabilities. The lamp can rotate on its vertical axis, translate on its base, undergo relative rotation of two parts, such as the parts of a vertical support or the vertical support or lamp arm. That vertical support may be formed of two or more elements permitting height adjustment, such as tube elements that may be collinearly slidable one within another. The lamp has a lamp arm supporting the light that can be set at an angle relative to a vertical support and releasably locked into position, such as by having the first end of the vertical support having a ratchet and the distal end of the arm having a spring-loaded releasable pawl adapted to lock the pawl of the boom arm on teeth of the ratchet of the central body at specific desired angle, or by having a locking elbow mechanism mounted on the vertical support having the ratchet and pawl mechanism. The arm likewise may be formed of two or more elements permitting length adjustment, such as tube elements that may be collinearly slidable one within another. The light unit includes a light reflecting unit and a light unit connector, which may have a front face, a rear face and a plurality of light sources. In addition, the front face may have a diffusing panel capable of reducing sharpness of the plurality of light sources, when targeted on a desired area, and is translucent in nature and adapted to provide uniform illumination on the target area. The lamp can also provide great freedom of motion between the boom arm and the light source, including one or more sources of three degrees of freedom between the light unit and boom arm. The lamp also supports a battery power source adapted to power the plurality of light sources, and may include an adaptor to accept commercially-available rechargeable power tool batteries. And the portable lamp is foldable in nature, in addition to the boom arm and central body being reduceable to their minimum length. The legs are lockable into a down and folded configuration, including a spring-loaded releasable multi-position latching mechanism.

BRIEF DESCRIPTION OF THE DRAWINGS

So that the manner in which the above recited features of the present disclosure can be understood in detail, a more particular description of the disclosure is illustrated in the appended drawings. It is to be noted, however, that the appended drawings illustrate only typical embodiments of the disclosure and are therefore not to be considered limiting in scope, as the disclosure may support other equally effective embodiments. While the present disclosure is described herein by way of example using embodiments and illustrative drawings, those skilled in the art will recognize that the disclosure is not limited to the embodiments of drawing or drawings described, and are not intended to represent the scale of the various components. The present disclosure is described hereinafter by various embodiments with reference to the accompanying drawing, wherein reference numerals used in the accompanying drawing correspond to the like elements throughout the description.

These and other features, benefits, and advantages of the present disclosure will become apparent by reference to the following figures, with like reference numbers referring to like structures across the views, wherein:

FIG. 6 illustrates a cross section partial cutaway view of a tripod of a portable lamp in a partially folded state, along section lines C-C, in accordance with an embodiment of the present invention; and.

DETAILED DESCRIPTION

Figure 1:
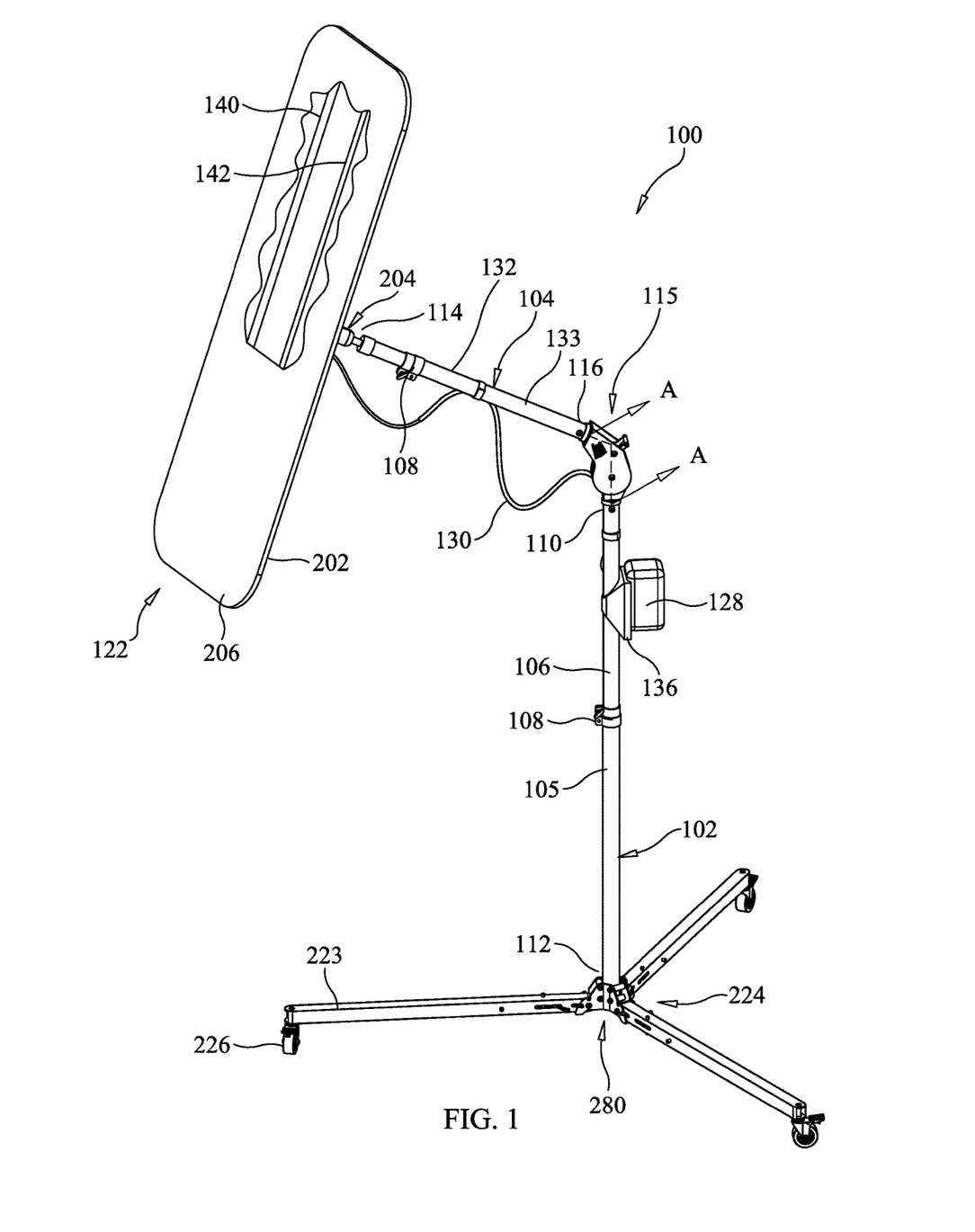
FIG. 1 illustrates a perspective view of a portable lamp, in partial cutaway, in accordance with an embodiment of the present invention.
Figure 2A:
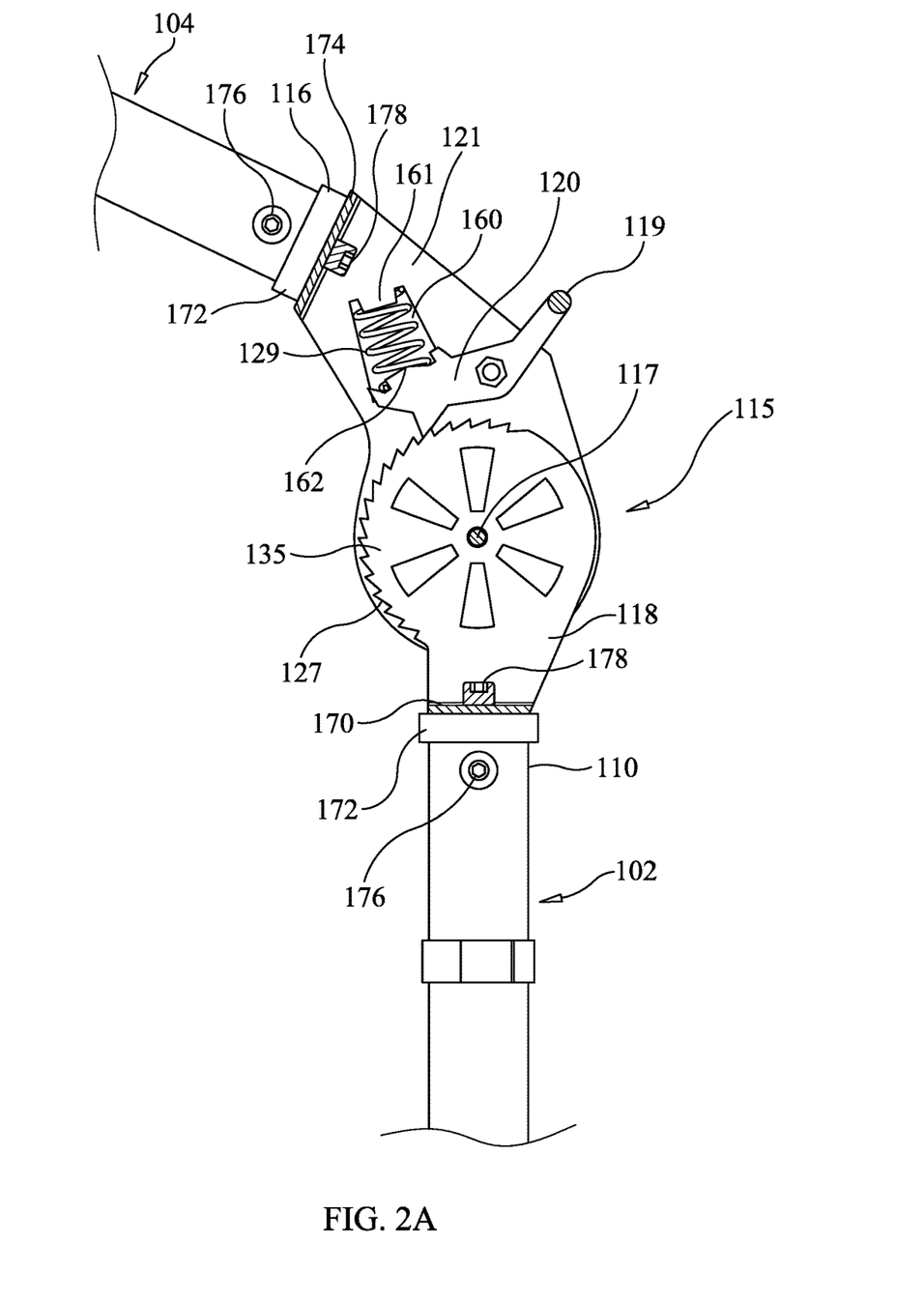
FIGS. 2A & 2B illustrate partial cross sections of a joint of a portable lamp in differing configurations, along section lines A-A and B-B, in accordance with an embodiment of the present invention.
Figure 4A:
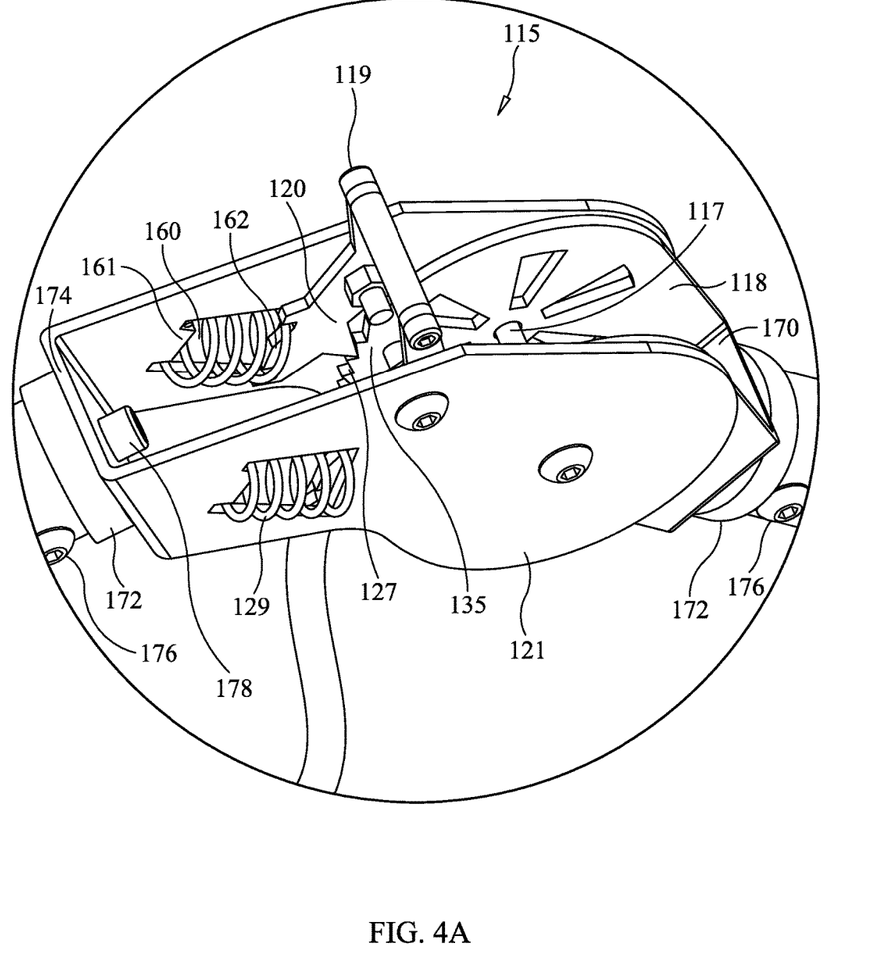
FIGS. 4A & 4B illustrate a detail perspective views of a joint of a portable lamp in differing operating states, in accordance with an embodiment of the present invention.

An embodiment of the invention is illustrated in FIGS. 1, 2A & 4A. Portable lamp (100) comprises central body (102) and boom arm (104). Central body (102) is extended along a vertical axis of central body (102) to a predetermined length. Further, central body (102) is capable of rotating on the vertical axis of central body (102). In accordance with one embodiment, height of central body (102) is adjustable, and may be increased and decreased as required.

Figure 3:
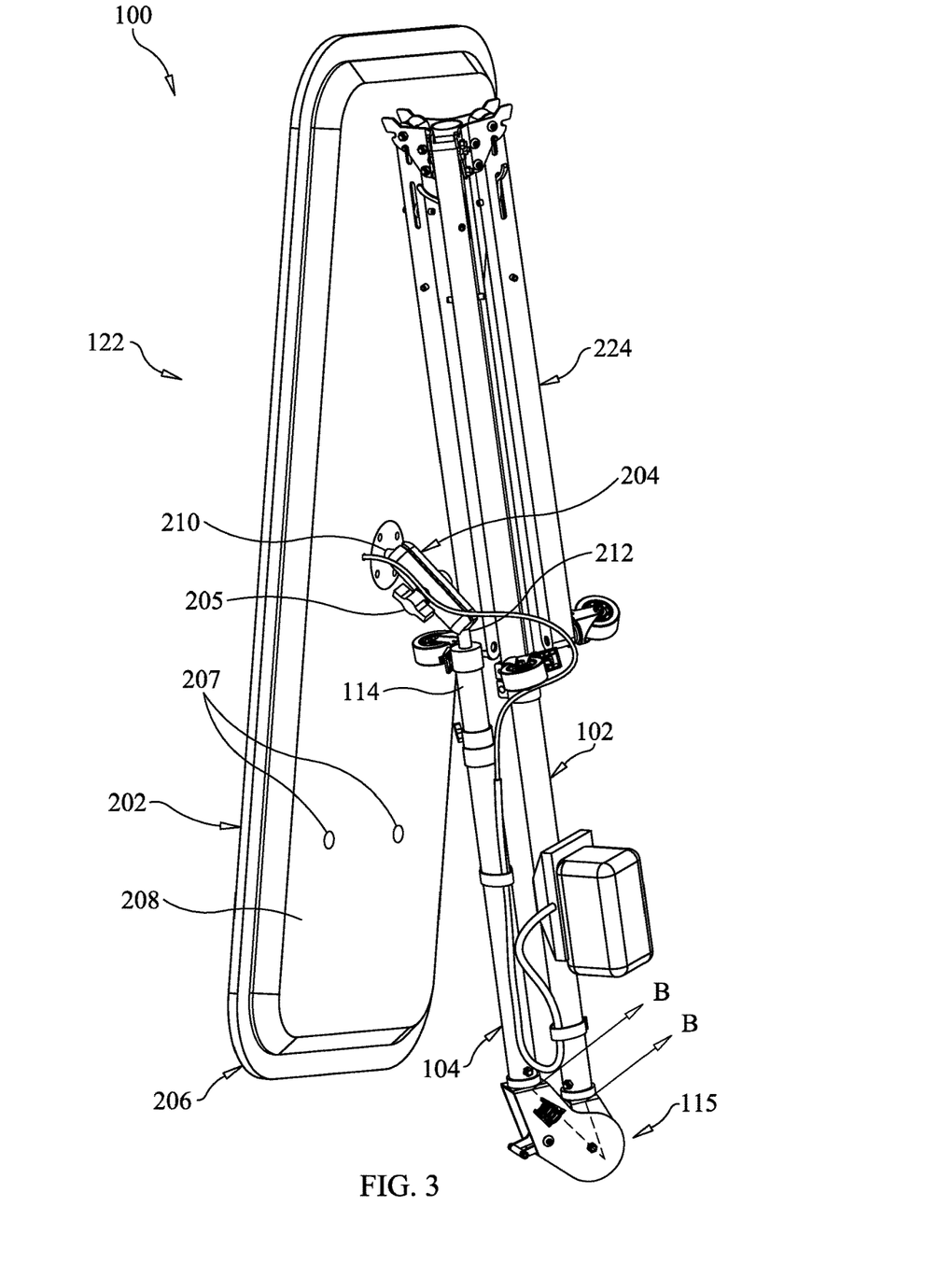
FIG. 3 illustrates a perspective view of the portable lamp in a folded configuration, in accordance with an embodiment of the present invention.

In accordance with one embodiment, central body (102) is adjustable in height and includes upper tube (106) and lower tube (105). Upper tube (106) and lower tube (105) are collinear. Upper tube (106) is slidable over lower tube (106). At its lower end, lower tube (105) is attached to tripod stand (124) and at its upper end, upper tube (106) is attached to elbow joint (115). Circular compression lock (108) allows upper tube (106) and lower tube (105) to be locked together to hold central body (102) at a fixed height, or unlocked to permit that height to be adjusted as shown in FIG. 1 and FIG. 3.

In accordance with another embodiment (not shown assembled), the length of central body (102) is increased by using multiple length elongating units. Length elongating unit (106) is a rod-like structure having threads on both ends. Further, central body (102) contains a coupling adapted to adjust the length of central body (102). Further, the length elongating unit is fitted in between central body (102) by removing the coupling of central body (102). The removal of the coupling divides central body (102) into two parts. The length elongating unit is fixed between the two divided parts of central body (102) by threading the coupling on each end of the length elongating unit with central body (102).

Central body (102) has upper end (110) and lower end (112). Boom arm (104) has a proximal end (114) and distal end (116). Distal end (116) of boom arm (104) is connected to upper end (110) of central body (102) by elbow joint (115). Elbow joint (115) allows boom arm (104) to be rotatably fixed to upper end (110) of central body (102).

Elbow joint (115) is intended to allow free rotation about an axis when desired, (typically horizontal) of boom arm (104), about approximately 180°, while allowing boom arm (104) to be fixed at a given angle or rotation from folded to vertical. Fixing boom arm (104) in position is accomplished via a positive locking joint. A positive locking joint may involve mechanically interfering or interlocking structures, one or more of which is biased to a locking (interfering configuration) but is releasable (adjustable configuration).

Figure 2B:
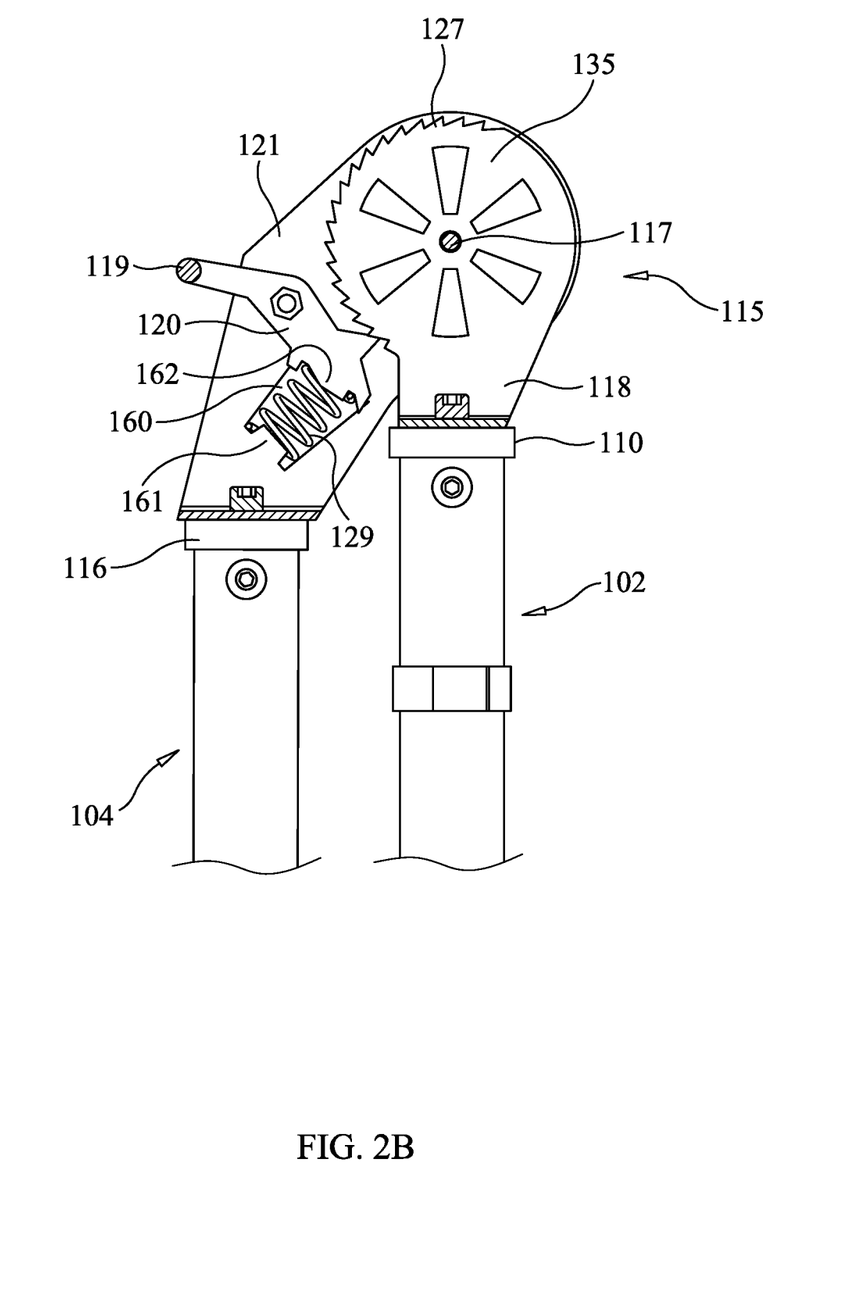
Figure 4B:
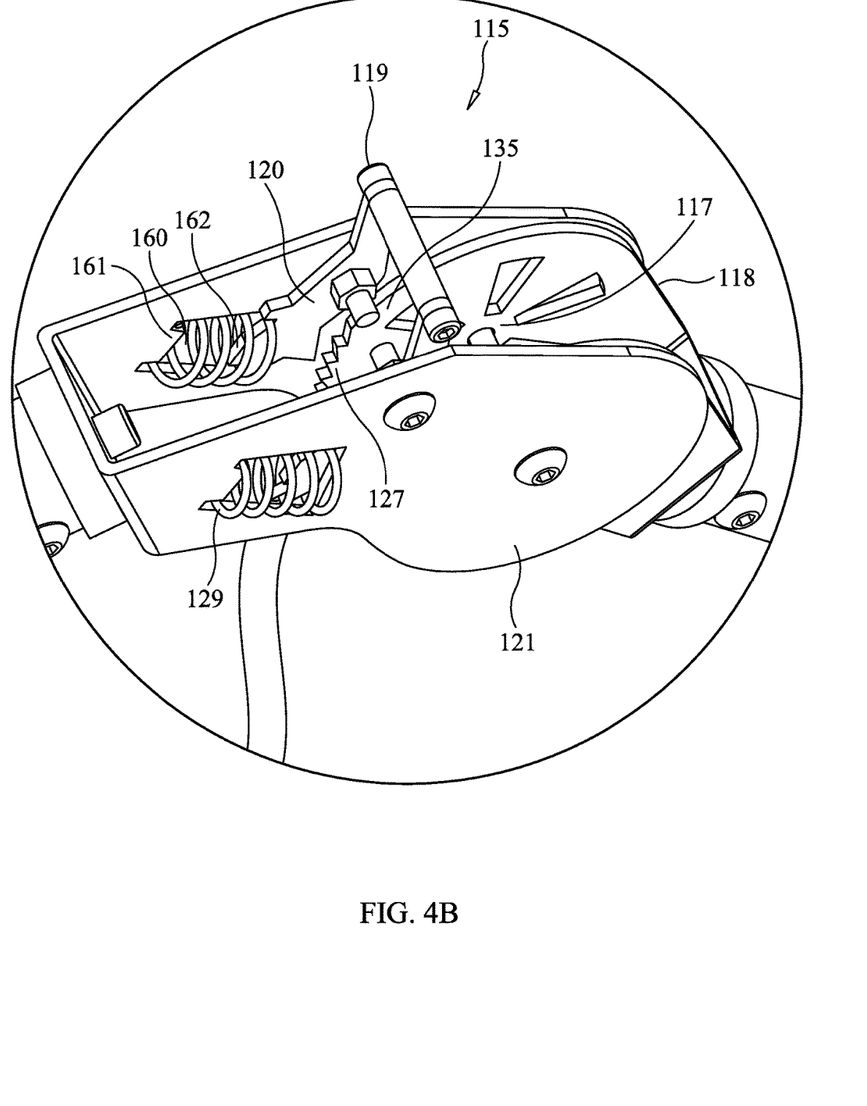

In an embodiment, elbow joint (115) includes ratchet (118) and pawl (120) adapted to lock boom arm (104) on ratchet (118) at specific desired angle. FIGS. 3 and 2B show another angle in which ratchet (118) has been placed, here to permit portable lamp (100) to reach a folded configuration. Ratchet (118) is a pair of arcuate sections (135) each with sets of angled teeth (127) in which pawl (120) engages and allows motion in one direction only when engaged, as depicted in FIG. 4A. In this embodiment, that direction is elevation of boom arm (104). The two arcuate sections (135) are joined by axle (117) and connector (170). Arcuate sections (135) are fixed to upper end (110) of central body (102) by bolt (178) through connector (170) and into plug (172). Plug (172) is seated in upper end (110) of central body (102) and retained by screw (176). In one embodiment, arcuate sections (135) do not rotate relative to axle (117), or to central body (102). Elbow joint (115) further includes a pair of brackets (121) which are, in this embodiment, rotatable relative to, ratchet (118) and axle (117). At its proximal end, pair of brackets (121) are joined by connector (174) and are fixed to and support boom arm (104). Brackets (121) are fixed to boom arm (104) by bolt (178) through connector (174) and into plug (172). Plug (172) is seated in distal end (116) of boom arm (104) and retained by screw (176). Pawl (120) is rotatably fixed to brackets (121) and held into arcuate sections (135) of ratchet (118) using spring (129) urging it distally, thus fixing the rotational position of boom arm (104). Spring (129) is held in void (160) of bracket (121), and fixed at one end by tab (161) formed in bracket (121) and at the other end by pushtab (162) formed on the back side of pawl (120). As shown in FIG. 4B, release handle (119) acts as a lever to pull pawl (120) proximally against spring (129) to release pawl (120) from ratchet (118) and allows free rotation of boom arm (104) in two directions (upward or downward) about a horizontal axis.

In an embodiment, ratchet (118) also includes additional teeth (127) corresponding to the folded position that prevent rotation in both the elevation and folding directions when pawl (120) is engaged. This holds boom arm (104) in the folded position. In this embodiment, elevating boom arm (104) from the folded position initially requires operation of release handle (119) to release pawl (120) from teeth (127), after which elevation may continue without operating release handle (119).

Figure 7A:
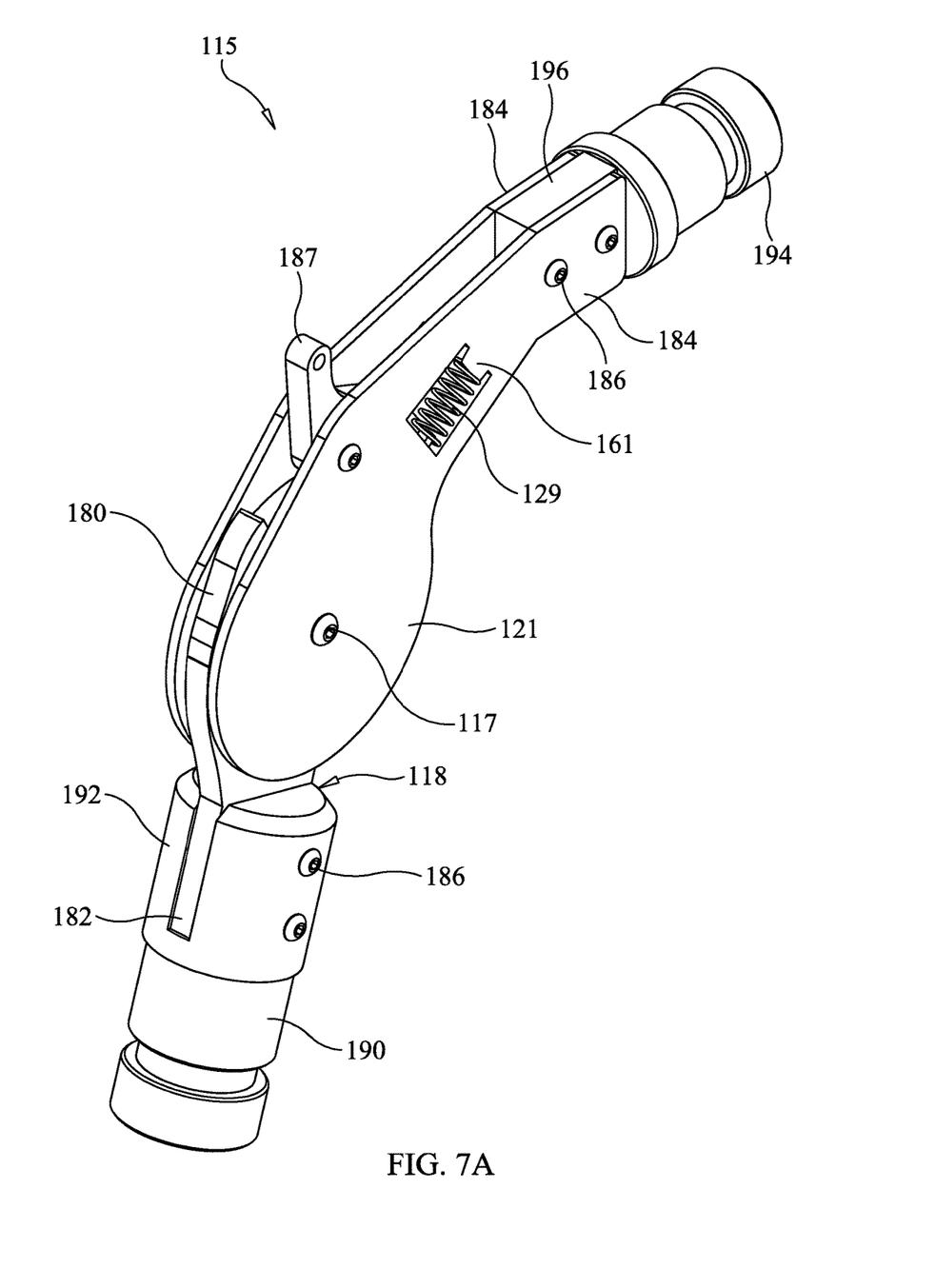
FIGS. 7A-7B illustrate two perspective views of a component of a joint of the portable lamp in an unfolded configuration, in accordance with a second embodiment of the present invention.
Figure 7B:
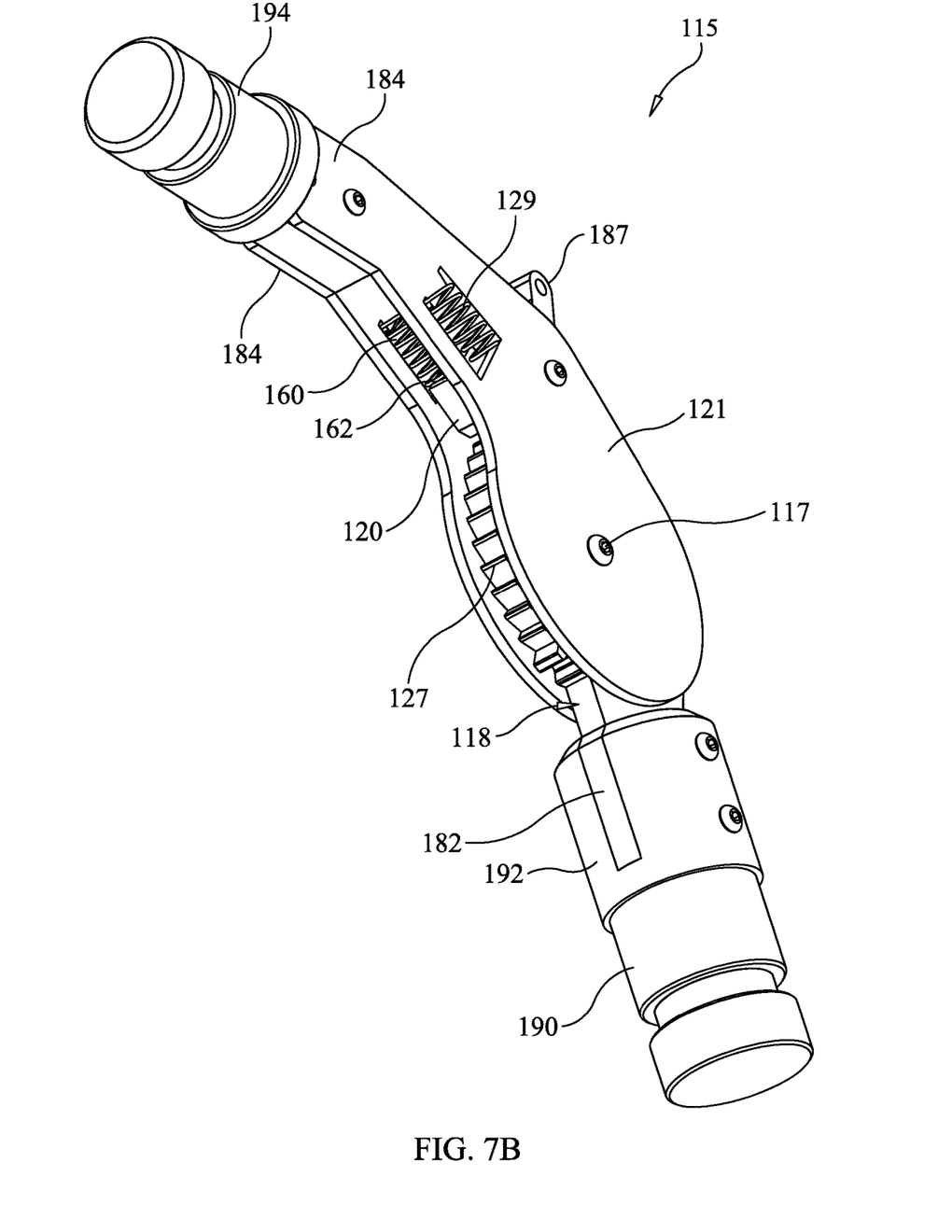

In another embodiment (shown in FIGS. 7A-7B in isolation from central body (102) and boom arm (104)), elbow joint (115) includes ratchet (118) and pawl (120) adapted to lock boom arm (104) (shown in FIG. 2A) on ratchet (118) at specific desired angle. Ratchet (118) includes attachment tab (182) at the lower end of ratchet plate (180). Sets of angled teeth (127) are formed on ratchet plate (180), in which pawl (120) engages and allows motion in one direction only when engaged, as depicted in FIGS. 7A & 4A. In this embodiment, that direction is elevation of boom arm (104). Ratchet (118) is fixed to upper end (110) of central body (102) (shown in FIGS. 2A & 4A) by bolts (186) fixing attachment tab (182) within a gap formed between left and right end-tabs (192) of bottom plug (190), such that ratchet (118) is fixed and does not rotate relative to central body (102). Bottom plug (190) is seated in upper end (110) of central body (102) and retained by screw (176) (in the manner shown in FIGS. 2A & 4A). Elbow joint (115) further includes a pair of brackets (121) rotatable relative to axle (117). At its proximal end, pair of brackets (121) each include attachment tabs (184) and are fixed to and support boom arm (104). Brackets (121) are fixed to boom arm (104) (shown in FIGS. 2A & 4A) by bolts (186) fixing each of attachment tabs (184) to an opposing side of center tab (196) of upper plug (194). Upper plug (194) is seated in distal end (116) of boom arm (104) (shown in FIGS. 2A & 4A) and retained by screw (176). Brackets (121) and ratchet (118) are joined by axle (117) and are rotatable thereabout. Pawl (120) is rotatably fixed to brackets (121) and held into teeth (127) of ratchet (118) using spring (129) urging it distally, thus fixing the rotational position of boom arm (104). Spring (129) is held in void (160) of bracket (121), and fixed at one end by tab (161) formed in bracket (121) and at the other end by pushtab (162) formed on the back side of pawl (120). Release lever (187) acts as a lever to pull pawl (120) proximally against spring (129) to release pawl (120) from ratchet (118) and allows free rotation of boom arm (104) in two directions (upward or downward) about a horizontal axis.

Continuing with FIGS. 7A-7B, in an embodiment, ratchet (118) also includes additional teeth (127) corresponding to the folded position that prevent rotation in both the elevation and folding directions when pawl (120) is engaged. This holds boom arm (104) in the folded position. In this embodiment, elevating boom arm (104) from the folded position initially requires operation of release lever (187) to release pawl (120) from teeth (127), after which elevation may continue without operating release lever (187).

The ratchet (118) and pawl (120) mechanism of elbow joint (115) is robust and avoids slipping of the locking mechanism. In accordance with one embodiment, elbow joint (115) provides a single degree of freedom between boom arm (104) and central body (102).

Turning to FIGS. 1 & 3, boom arm (104) in this embodiment is of adjustable length and includes proximal tube (132) and distal tube (133) are collinear. Proximal tube (132) is slidable inside distal tube (131). At its distal end, distal tube (133) is attached to elbow joint (115) and at its proximal end, proximal tube (132) is attached to light unit (122). Circular compression lock (108) allows proximal tube (132) and distal tube (133) to be locked in position together or adjusted. This permits increasing and decreasing the length of boom arm (104), as shown in FIGS. 1 & 3 and FIG. 4.

Figure 5:
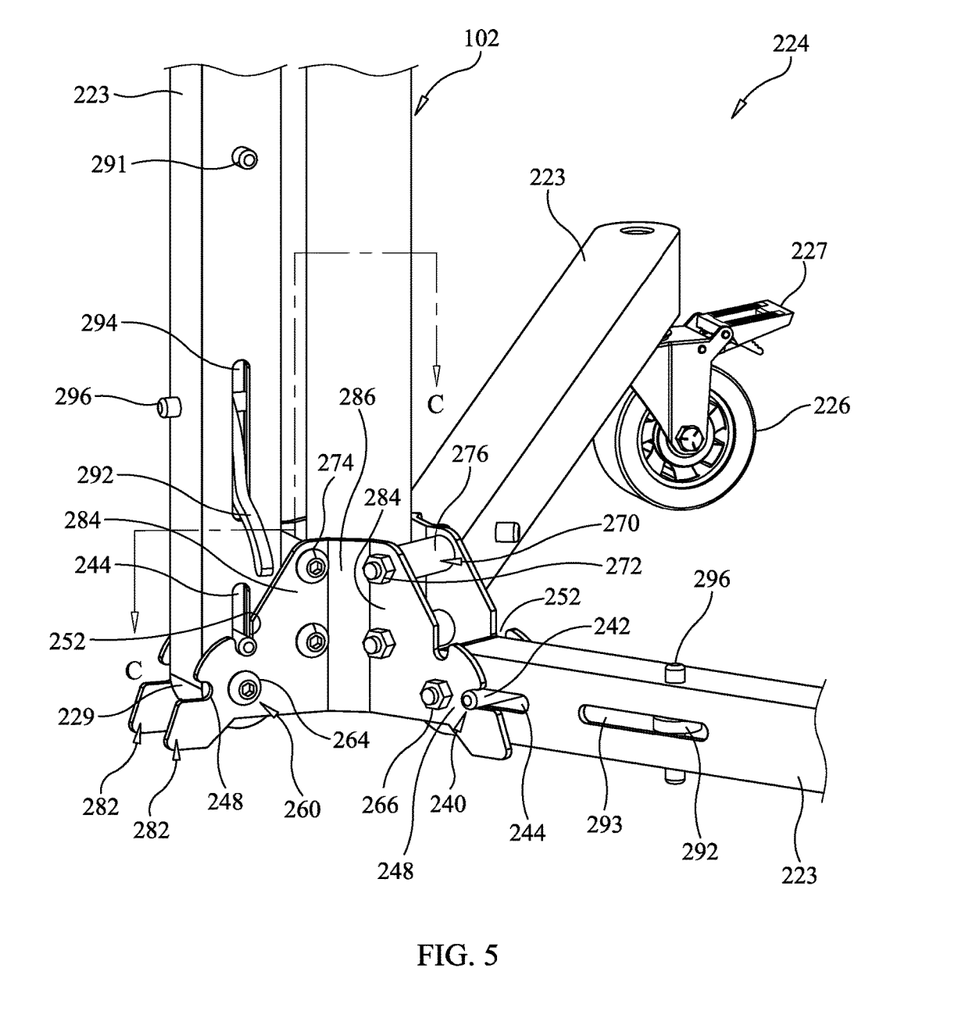
FIG. 5 illustrates a detail perspective views of a tripod of a portable lamp in a partially folded state, in accordance with an embodiment of the present invention.
Figure 6:
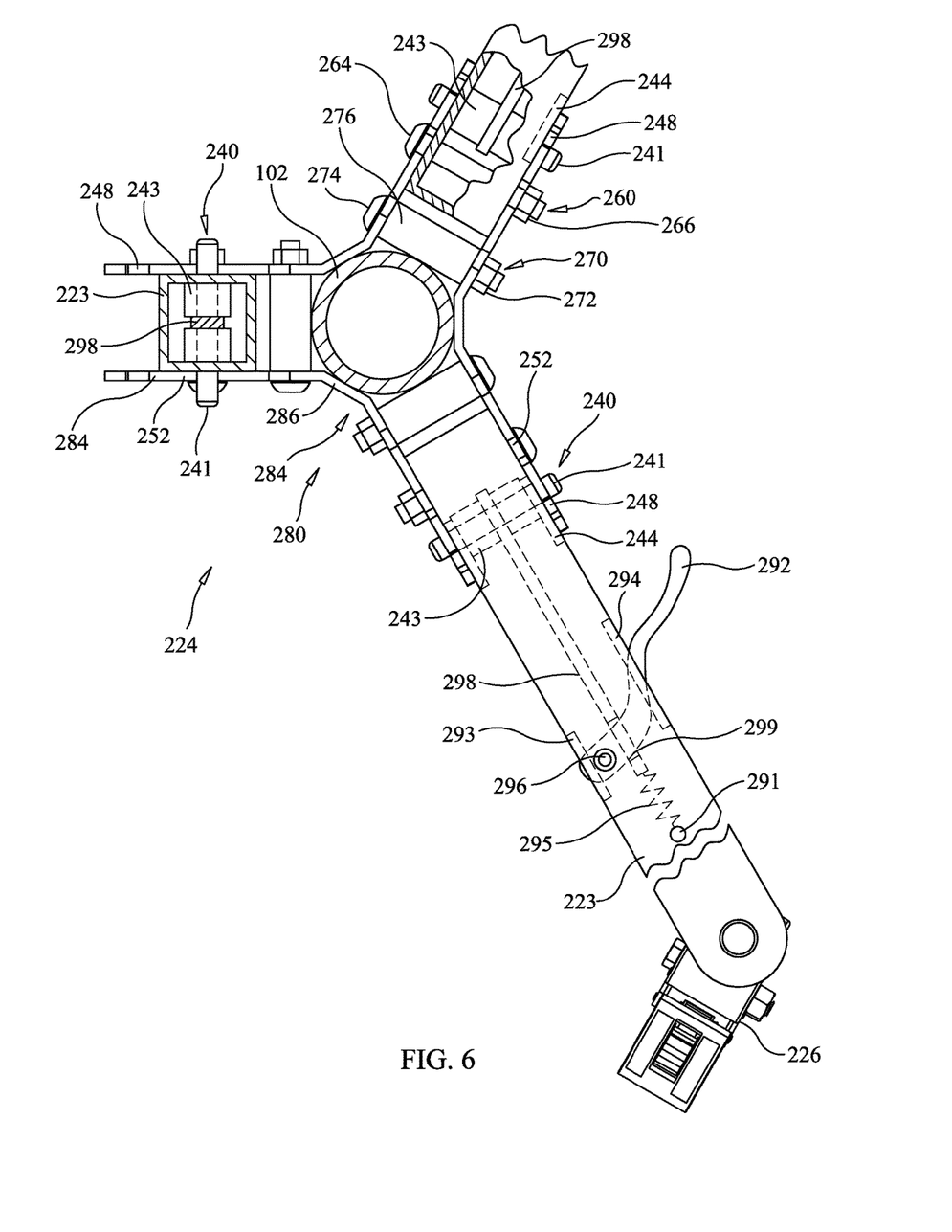

In an embodiment, as shown in FIGS. 1, 3, 5 & 6, a locking flat tripod stand (224) is provided. Lower end (112) of central body (102) is fixed to flat tripod stand (224) by a clamping and locking system, here comprising a locking bracket (280). Locking bracket (280) is clamped to central body (102) and holds individual legs (223) in place in either an up (folded) position (such that legs (223) are parallel to the vertical axis of central body (102)) or down (supporting) position. FIG. 1 shows the down position; FIG. 3 shows the folded position; and FIGS. 5 & 6 shown one leg folded and two legs down.

Locking bracket (280) includes a set of three angled locking plates (282) having central section (286) with a contact surface for contacting central body (102) and two leg sections (284) for supporting legs (223) that are formed at an obtuse angle from central section (286) (away from central body (102)) to form channels for legs (223). A locking plate (282), in cooperation with an adjacent locking plate (282), support and lock each of legs (223), (223), permitting rotation between the folded and supporting positions.

Locking bracket (280) is clamped to central body (102) by pairs of bolt sets (270) formed of nut (272) and bolt (274) which pull together adjacent locking plates (282), through holes therein, but which is held at a fixed spacing by spacer (276).

Legs (223) rotate with respect to locking bracket (280) by axle (260) formed of nut (264) and bolt (266) which are attached on the outer sides of adjacent locking plates (282). Bolt (266) passes through holes therein and through a bearing mechanism at the proximal end of leg (223). That bearing mechanism can take the form of simple aligned holes in the proximal end of leg (223) through which bolt (266) passes, or an insert (229) attached to the proximal end of leg (223) formed, for example, of low-friction material with a hole for bolt (266) (as depicted on the left and bottom-right legs)

Locking bracket (280) also includes a locking mechanism for each leg. The locking mechanism includes a release system and a latch system. The release system includes a hand-actuatable release device, and a latch released by that release device one or more latchable positions. A release device may be a lever-actuated mechanism to assist in overcoming a bias to one or more latched positions created by a biasing structure, such as a spring, urging the mechanism to a locked status in one or more positions. A latch system may be based on active prevention of movement (such as an enclosing structure about a moving portion), or on mechanically interfering structures, including a releasable portion in a low-energy position in a fixed portion and thus holding the latched device in place, and one in which a bias exists to hold the releasable portion in the low-energy position.

In an embodiment, release system (290) includes lever (292) rotatable about pin (296). A working end of lever (292) extends through slot (294) in leg (223) to provide the user a lever advantage for actuating release system (290). The other end of lever (292) is permitted to rotate in slot (293) in leg (223). Lever (292) extends through capture slot (299) in pushrod (298) which is sized large enough to permit lever (292) to rotate about pin (296) (and thus change angle of capture within in capture slot (299)) but small enough to cause pushrod (298) to move proximally when lever (292) is urged proximally, and distally when lever (292) is urged distally. Spring (295) is fixed to leg (223) by pin (291), and attached at its other end to pushrod (298) to push pushrod (298) proximally toward central structure (102) and locking plates (282), within the interior of leg (223).

In an embodiment, latch system (240) is actuated by the far end of pushrod (298). The far end of pushrod (298) is fixed to locking pin (241), such as by pin (241) passing through a hole in pushrod (298). Locking pin (241) extends from outside one side of leg (223), through a slot (244), through the interior of leg (223), through pushrod (298), through another slot (244) and outside the other side of leg (223). Spacers (243) are provided on either side of pushrod (298) between pushrod (298) and the interior surface of leg (223). Spacers may be low-friction material and act as linear bearings. Slots (244) are long enough to permit pin (241) to move distally and proximally (as urged by spring (295) or release system (290).

Latch system (240) also includes a set of detents forming low-energy positions to hold the legs in place. Each set of adjacent locking plates (282) includes a set of folded detents (252) and down detents (248). Folded detents (252) form a substantially U- or J-shaped cup in locking plates (282) that faces upward when central structure (102) is vertical. Down detents (248) also form a substantially U- or J-shaped cup in locking plates (282), but by contrast they face horizontally when central structure (102) is vertical.

Turning to FIGS. 1, 3, 5 & 6, locking bracket (280) provides a down (or supporting) latched position and an up (or folded) latched position. In either position, a spring-biased mechanism holds a releasable device in a low-energy position formed by locking plates (282). In the down latched position, locking pin (241) is urged into down detents (248) formed in locking plates (282) by the force of pushrod (298) as urged by spring (295). In the folded latched position, locking pin (241) is urged into folded detents (252) formed in locking plates (282) by the force of pushrod (298) as urged by spring (295).

Release system (290) operates by a user operating lever (292), pulling it distally, forcing it to rotate about pin (296) and force pushrod (298) distally. Doing so pulls locking pin (241) distally (which may be outward in in the down position or upward if in the folded position). As locking pin (241) moves sufficiently distally, it disengages from down detents (248) or folded detents (252), as appropriate. Disengagement allow leg (223) to rotate downward or upward as desired.

Once leg (223) is in the new desired position, lever (292) is operated in the proximal direction, forcing it to rotate about pin (296) and force pushrod (298) proximally. Doing so pushes locking pin (241) proximally (which may be inward in in the down position or downward if in the folded position), and as urged by spring (295). As locking pin (241) moves sufficiently proximally, it engages with down detents (248) or folded detents (252), as appropriate. Engagement locks leg (223) in that folded or down position.

Flat tripod stand (224) is also provided with wheels (226) which may be wheels formed of soft materials on an offset axle to act as a caster, and provided with a foot-operated lock (227) to hold portable lamp (100) in position. Wheels (226) may also be simple casters.

Portable lamp (100) further comprises light unit (122). Light unit (122) is capable of illuminating the area on which light unit (122) is concentrated. Further, light unit (122) is rotatably fixed to proximal end (114) of boom arm (104). As shown in FIGS. 1 & 3, light unit (122) includes light reflecting unit (202) and light unit connector (204). Further, light reflecting unit (202) has front face (206), rear face (208) and tube light sources (140, 142) inside light reflecting unit (202).

Further, light unit connector (204) is capable of providing more than three degrees of freedom to light unit (122). Light unit connector (204) is provided with ball joint (210) at one end and ball joint (212) at the other end as shown in FIG. 2. Ball joint (210) is connected to rear face (208) of light reflecting unit (202). Ball joint (210) permits light reflecting unit (202) rotation, yaw and roll relative to light unit connector (204). Ball joint (212) of light unit connector (204) is connected to proximal end (114) of boom arm (104) and permit light unit connector (204) rotation, yaw and roll relative to boom arm (104). Clamp (205) is provided to lock down ball joints (210, 212) to fix the position of light reflecting unit (202) and light unit connector (204) relative to boom arm (104) or to permit movement relative thereto. Undoing clamp (205) sufficiently allows ball joints (210, 212) to be removed entirely from light unit connector (204), thereby disconnecting light unit (122) from boom arm (104).

In accordance with one embodiment, front face (206) is a diffusing panel capable of reducing sharpness of the plurality of light sources, when targeted on a desired area. Further, the diffusing panel is a light-scattering medium and translucent in nature and adapted to provide uniform illumination on the target area. Further, the diffusing panel is placed in the path of the plurality of light source to reduce and/or soften the lighting, and prevent them from reflecting on the work surface as point sources. In accordance with one embodiment, the diffusing panel is provided in different forms, and selected from a group of, perforated cone, wedge, or baffle placed adjacent to a light source to scatter the light and prevent glare. In accordance with one embodiment of the invention, the diffusing panel is white in color. in accordance with one embodiment, the diffusing panel is an acrylic plexiglass approximately 0.125" in thickness. In accordance with one embodiment, exterior surface of rear face (208) is a reflecting material adapted to reflect the light towards front face (206) of light reflecting unit (202). Further, the reflecting material can be any shining material adapted to concentrate the light on the front face of light reflecting unit (202).

In accordance with one embodiment, the plurality of light sources are provided in light reflecting unit (202) enclosed between rear face (208) and front face (206) of light reflecting unit (202). Each of the plurality of light source is provided a separate on/off switch (207) (shown in FIG. 3). Further, the plurality of light sources is selected from a group comprising of, but not limited to, incandescent lamp, compact fluorescent light (CFL) and light emitting diode (LED) bulbs. In an exemplary embodiment of the invention, two tube light sources (140, 142) are used. Tube light sources (140, 142) are arranged in parallel to each other along the horizontal axis of light reflecting unit (202). In accordance with one embodiment of the invention, a pair of LED strips are used, with a SMD2216 one meter in length being exemplary. In accordance with embodiment of the invention, the plurality of light sources is of different colors and selected from a group comprising of, but not limited to, Soft White having temperature range 2700K-3000K, Bright White and/or cool white having temperature range 3500K-4100K and Daylight having temperature range from 5000K-6500K.

The length, color, and number of sources may vary depending upon application and preference. In one embodiment, three sources could be used (not shown), with each of the three colors/temperature ranges. In another embodiment, one or more range could be duplicated, among the two or three or more sources provided. In one embodiment, two sources are used, and the colors/temperature ranges are selected from the ranges above, but are not duplicated.

In accordance with one embodiment, portable lamp (100) further comprises battery (128) adapted to power the plurality of light sources provided in light unit (122) through set of wires (130) as shown in FIG. 1. Battery (128) is supported on central body (102) using battery receiver (136) adapted to hold battery (128) and receive power therefrom. In an exemplary embodiment of the invention, battery (128) is 35V, rechargeable, having a high power density and weighing about one lb. Exemplary batteries include those commonly used as interchangeable power sources for hand power tools. Battery (128) provides about 10 hours of working time to portable lamp (100). It will be appreciated by a person skilled in the art that battery (128) can be any suitably selected and providing higher working hours. Further, set of wires (130) are enclosed in a protective cable enclosure.

In accordance with one embodiment, the portable lamp (100) may have as many as twelve degrees of freedom in totality. The twelve degrees of freedom include movement of portable lamp (100) in X and Y direction on the shop floor, extension and retraction of central body (102), rotation of central body (102) on its vertical axis, pivoting motion of boom arm (104), extension and retraction of boom arm (104) and three degrees of freedom each provided to light connector unit (204) and to light unit (122) as explained above and shown in FIG. 2 by marking directional arrows.

Height of central body (102) may be adjusted up and down by releasing circular compression lock (108) and slidably adjusting the tubes. For larger angular adjustment of light unit (122), elbow joint (115) is provided with boom arm (104) that allows adjusting boom arm (104) at required angle. Further, light unit (122) is provided with six degrees of freedom (indirectly) that allows adjusting the orientation of front face (206) of light reflecting unit (202) such that light is concentrated on the targeted surface area. Further boom arm (104) also may be adjusted in length as described above.

The embodiments of portable lamp (100) presented above offer a number of advantages such as, but not limited to, increased flexible and adjustable portable lamp (100). Further, portable lamp (100) includes twelve degrees of freedom that allow orienting and adjusting portable lamp (100) at the required height, position, and desired angle. Further, height adjustment allows portable lamp (100) to take light unit (122) at any desired height.

Unfolding portable lamp (100) can be accomplished by the following steps.

If necessary, in step 400, connect light unit (122) to boom arm (104), including inserting ball joint (210) into light unit connector (204), in step 405, and inserting ball joint (212) into light unit connector (204), in step 410. In step 415, if necessary, operate clamp (205) to lock ball joints (210, 212) in light unit connector (204). It may be preferable to carry out steps 400-415 before step 420, to avoid strain on wires (130) if not detached.

In step 420, pull release handle (119), if necessary, which releases pawl (120) from ratchet (118) in the folded position in step 425. In step 430, rotate boom arm (104) in the elevation direction to the desired angle, ending rotation in step 440. During rotation, in step 435, pawl (120) will repeatedly slip in the elevation direction over teeth (127), but then lock and prevent depression of boom arm (104).

In step 450, extend central body (102), including unlocking circular compression lock (108), in step 455, to permit upper tube (106) slide upward over lower tube (106), in step 460, and then relocking circular compression lock (108), in step 465.

In step 470, operate release system (290), including, in step 475, pulling operating lever (292) distally and forcing it to rotate about pin (296) and to force pushrod (298) distally. In step 480, this pulls locking pin (241) distally (upward). In step 485, locking pin (241) moves sufficiently distally and disengages from folded detents (252). In step 490, rotate leg (223) downward to the folded position. In step 500, operate release system (290), including, in step 505, pushing operating lever (292) proximally and forcing it to rotate about pin (296) and to force pushrod (298) proximally. In step 510, this pushes locking pin (241) proximally (inward). In step 515, locking pin (241) moves sufficiently proximally and engages with down detents (248). In steps 520 and 530, repeat steps 470-515 for the other legs. It may be preferable to carry out steps 470-530 first to provide a stable base for the other portable lamp folding steps.

Folding portable lamp (100) can be accomplished by the following steps.

In step 600, pull release handle (119) to release pawl (120) from ratchet (118) an open position in step 605. In step 610, maintaining pressure on release handle (119), rotate boom arm (104) in the depression direction to the folded position, ending rotation in step 620. During rotation, in step 615, pawl (120) is in maintained in the released state and passes over teeth (127). In step 625, after rotation, release pressure on release handle (119) which, in step 630, engages pawl (120) with teeth (127) of ratchet (118), preventing inadvertent elevation of boom arm (104).

In step 640, collapse central body (102), including unlocking circular compression lock (108), in step 645, to permit upper tube (106) slide downward over lower tube (106), in step 650, and then relocking circular compression lock (108), in step 655.

If necessary, in step 660, disconnect light unit (122) from boom arm (104), including, in step 670, operating clamp (205) to unlock ball joints (210, 212) from light unit connector (204), and, removing ball joint (210) from light unit connector (204), in step 675, and removing ball joint (212) from light unit connector (204), in step 680.

In step 690, operate release system (290), including, in step 695, pulling operating lever (292) distally and forcing it to rotate about pin (296) and to force pushrod (298) distally. In step 700, this pulls locking pin (241) distally (inward). In step 705, locking pin (241) moves sufficiently distally and disengages from down detents (248). In step 710, rotate leg (223) upward to the folded position. In step 720, operate release system (290), including, in step 725, pushing operating lever (292) proximally and forcing it to rotate about pin (296) and to force pushrod (298) proximally. In step 730, this pushes locking pin (241) proximally (downward). In step 740, locking pin (241) moves sufficiently proximally and engages with folded detents (248). In steps 750 and 760, repeat steps 690-740 for the other legs.

Further, portable lamp (100) allows a user to clearly view the area of the vehicle body requiring dent repair. Portable lamp (100) is typically placed facing the user, and on the opposite side of the area under repair. Further, the reflection of light sources highlights the shape and size of the dent, while repairing, thus allows the user to easily repair the dented area.

The invention claimed is:

1. A portable lamp comprising:
   a vertical support;
   a boom arm;
   a light unit supported from the boom arm; and
   a positive locking joint connecting the vertical support and the boom arm;
      said locking joint selectively allowing elevation and depression of said boom arm;
   said positive locking joint comprising
   a ratchet;
      said ratchet having teeth; and
   a pawl;
      having an engaged position and a released position;
      wherein in the engaged position said pawl locks on the said teeth to hold the boom arm at specific desired angle while permitting said elevation; and
      wherein in the released position said pawl unlocks from the said teeth; and said locking joint selectively allowing depression of said boom arm requiring said pawl be in said released position.

2. The portable lamp of claim 1, said positive locking joint further comprising:
a biasing structure holding said joint in said mechanically interlocking operational state; and
a release to overcome said biasing structure for transitioning to said adjustable operational state.

3. The portable lamp of claim 1, further comprising:
a base comprising a foldable multi-legged stand;
said multi-legged stand comprising
at least three legs;
each leg being rotatable between a folded position and a supporting position; and
each leg being lockable in the supporting position.

4. The portable lamp of claim 3, further comprising:
each leg comprising a releasable latch biased to a latching position; and
said multi-legged stand further comprising locking detents;
wherein said releasable latches act to hold said legs in a supporting position by being latched into said locking detents;
said releasable latches comprising;
a locking pin adapted to engage in said locking detents;
a pushrod attached to said locking pin;
a spring urging pushrod and locking pin toward said locking detents; and
a lever mechanism attached to said pushrod;
wherein rotation of said lever mechanism pulls said pushrod and locking pin away from said locking detents.

5. The portable lamp of claim 4:
said multi-legged stand further comprising a locking bracket;
said locking bracket comprising said locking detents.

6. A method of operating a portable lamp comprising:
selectively operating a positive locking joint allowing elevation and depression of a boom arm;
said positive locking joint connecting a vertical support and the boom arm; and
said positive locking joint comprising a ratchet and pawl mechanism;
supporting a light unit from the boom arm;
said selectively operating step comprising first engaging said pawl by locking the pawl on teeth on said ratchet and then elevating the boom arm by applying an upwards force to the boom arm without operating a release on said positive locking joint; and
said selectively operating step further comprising first releasing said pawl by unlocking the pawl from said teeth on said ratchet, and then depressing the boom arm;
said releasing step comprising operating the release on said positive locking joint.

7. The method of operating of claim 6,
said step of operating the release comprising overcoming a biasing structure holding said joint in a mechanically interlocking operational state.

8. The method of operating of claim 6, further comprising:
rotating a leg of a foldable multi-legged stand on said lamp from a folded position to a supporting position; and
locking said leg in said supporting position.

9. The method of operating of claim 8:
said multi-legged stand further comprising locking detents; and
said rotating step comprising forcing a releasable latch from one of said detents to an unlatched position, said releasable latch biased to a latching position;
said forcing step comprising rotating a lever mechanism attached to a pushrod to move a locking pin attached to the pushrod against a spring urging the pushrod toward said locking detents; and
said locking step comprising allowing said releasable latch to enter the latching position in one of said detents when said leg is in said supporting position.

* * * * *